Dec. 30, 1969           R. S. LEE           3,487,394

FAIL SAFE INDICATOR OF FAILURES IN HEATING APPARATUS

Filed Nov. 8, 1966

Inventor
Robert S. Lee
by Roberts, Cushman & Grover
Att'ys

United States Patent Office 3,487,394
Patented Dec. 30, 1969

3,487,394
FAIL SAFE INDICATOR OF FAILURES IN HEATING APPARATUS
Robert S. Lee, Beverly Farms, Mass.
(% Hotwatt Inc., 128 Maple St., Danvers, Mass. 01923)
Filed Nov. 8, 1966, Ser. No. 592,868
Int. Cl. G08b 21/00
U.S. Cl. 340—252                          3 Claims

ABSTRACT OF THE DISCLOSURE

A heater resistance contained in a casing and having a pair of terminals for connection to a power supply has a center lead dividing the heater resistance into two equal series resistances, and a lead extending from each of the power supply terminals. The three leads extend to a signal device which includes a three-element gaseous discharge lamp which lights whenever the voltage across two inputs exceeds a starting voltage. The center lead is connected to one of said elements, and the other two leads are connected through equal resistances to the remaining two elements. The resistances are of such values that the starting voltage of the gaseous discharge lamp is exceeded only when the heater resistance fails and produces an open circuit.

---

*The field* of this invention relates to signal devices and circuits for indicating failure of resistance means used, for example, as heaters.

In many cases it is desirable to indicate visually, as with a signal light, failures of resistance circuits such as are found in resistance heating apparatus. Such an indication pinpoints inoperative and sometimes dangerous situations and enables remedies to be promptly taken. Devices of this general type have heretofore been proposed. These however are not of the so-called "fail-safe" type but rather indicate normal operation so that unrelated events, such as failure of the indicator itself for example, are misleading. An example of such devices is disclosed in U.S. Patent No. 2,188,617 to G. P. Walpole, of Jan. 30, 1040.

*Objects* of the invention are to provide a signal device for indicating burn-out or other failure or impedance elements such as heater resistors, which gives positive indication of such failures, which requires little power upon such indication, which can be conveniently mounted near the supervised element on apparatus utilizing it or remotely therefrom, and which is simple and yet fully effective, inexpensive, and durable and reliable in use.

*The nature* of the invention may be briefly summarized as concerning a resistor device, such as is used in resistance heating means, that is associated with a three-input signal means (such as a three-electrode gaseous discharge lamp) of the type which gives a detectable signal whenever the voltage across any two inputs exceeds a starting voltage. According to the invention, a lead divides the resistor device intermediate its power supply terminals into two series resistances and is connected to a first of the signal means inputs. A first impedance means is connected between one of the terminals and a second of the inputs, and a second impedance means is connected between the other of the terminals and the third of the inputs. The impedance means have values such that the actuating voltage of the signal means (such as the starting voltage of a neon lamp) is exceeded only when one of the series resistances fails and produces an open circuit. If a lamp is used as signal means, the lamp is therefore unlit except when failure occurs, but lights to signal failure. Preferably, the lead divides the resistor device into two equal series resistances, and preferably the first and second impedance means have equal values, thereby eliminating current flow in the lead during normal operation. A modification, useful in some situations, has in addition to those mentioned above, a third impedance means connected between the second and third of the signal means inputs.

These and other objects, aspects, and advantageous results of the invention will be apparent in the following description of two embodiments illustrating its general characteristics.

Figure 1:
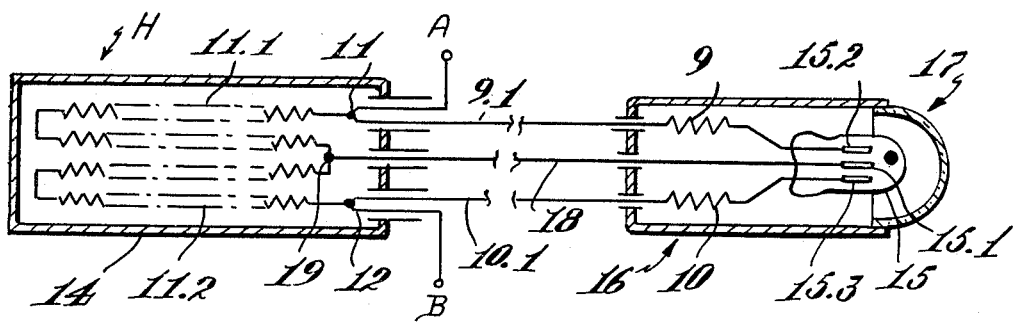
Figure 2:
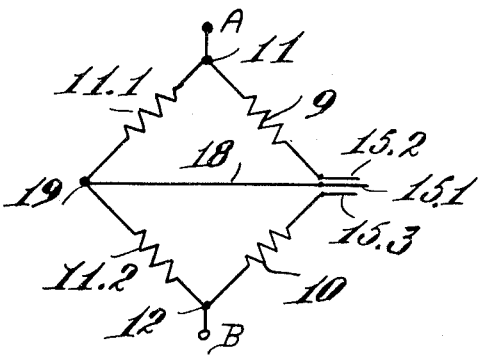
Figure 3:
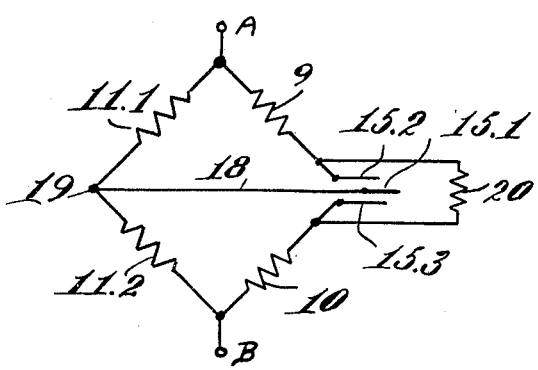

The description refers to a drawing in which
FIG. 1 is a side view of an embodiment of the invention;
FIG. 2 is a circuit diagram of this embodiment illustrating its operation; and
FIG. 3 is a circuit diagram similar to FIG. 2, of a modification of the invention.

Referring now to FIG. 1, there is shown a resistor unit H having terminals 11 and 12 for connection to a power supply A, B. The unit H is shown enclosed in a tube or other casing 14 for convenient use as a heating means. The casing is constructed in accordance with the specific purpose of the heater, which for example may be a cartridge for heating cement or other material, the temperature of which is critical for the process carried out by the machine within which the cartridge is used.

A lamp 15 having three electrodes 15.1, 15.2 and 15.3 is mounted in a socket or casing 16 which has a transparent cover 17. The casing 16 and the cover 17 protect the lamp 15 and are constructed in any desirable practical manner for easy and secure mounting of the lamp assembly on a machine chassis, panel or other suitable support. The lamp 15 is of the type which lights whenever the voltage across any two of its electrodes exceeds a starting voltage. The lamp is preferably a neon lamp which ionizes and glows above a characteristic voltage, usually about 90 v. in commercially available lamps. In place of the lamp 15, there may be used any three-input signal means, including relay apparatus, of the type giving a recognizable signal whenever the voltage across any two inputs exceeds a starting voltage.

The first electrode 15.1 of the lamp 15 is connected to the resistor unit 11 by a lead 18 which divides the unit at a point 19 intermediate its terminals into two series resistances 11.1 and 11.2 which are preferably of equal values. The second lamp electrode 15.2, is connected to one of the terminals, for example 11, through first impedance means 9, preferably a resistor, and a wire 9.1. The third electrode, 15.3, is connected to the other of the terminals, here 12, through second impedance means 10, preferably also a resistor, and a wire 10.1. Especially where the series resistances 11.1 and 11.2 are equal, it is preferable to make the impedances 9 and 10 equal in value, thereby eliminating current flow in the lead 18 during normal operation. As shown in FIG. 1, the resistors 9 and 10 are preferably mounted within the lamp casing 16, but it will be understood that they could be located elsewhere. As indicated in FIG. 1, the power supply from A and the wire 9.1 are conveniently brought out through a seal of the tube 14, and the supply lead from B and wire 10.1 are similarly arranged. Wire 18 is brought out separately from midpoint 19. In this manner, easily available connectors can be used to accommodate any peculiar requirement.

Referring now particularly to FIG. 2 for describing the operation of this circuitry, it may be assumed that impedance means 9 and 10 are selected with values high enough to provide a sufficient voltage drop such that, when the series resistances 11.1 and 11.2 are operating properly, the voltage across any two of the electrodes is below the starting voltage of the lamp 15. Impedances 9 and 10 are also selected with values sufficiently low such that, if either series resistance 11.1 or 11.2 of the heating unit fails and produces an open circuit, the voltage across two of the electrodes will exceed the starting voltage to light the lamp and thus to signal the failure. It will be understood that the values of the impedances 9 and 10 will depend on the voltage of the power supply at 11, 12, the resistance value of the unit H, and the volt-ampere characteristics of the lamp 15. It was found, however, especially if common neon glow tubes are used for the lamp 15, that the impedances 9 and 10 lie within a fairly broad range of values for ordinary power line voltages and a low wattage heater resistance. As a specific example, it has been found that 68K ohm resistors are suitable for impedances 9 and 10, for both 115 v. and 230 v. A.C. operation, using a three-electrode neon glow lamp of type LTD-27-2 available from Signalite, Inc., of Neptune, N.J.

The modification shown in FIG. 3 comprises the addition of a third impedance means 20, preferably a resistor, connected between the inputs to the electrodes 15.2 and 15.3. This modification is useful where the power supply is of high voltage compared to the starting voltage of the lamp, as it provides an additional expedient for reducing the voltage across electrodes 15.2 and 15.3 to a value below the starting voltage of the lamp. When this third impedance means 20 is used, impedance means 9, 10 and 20 are selected so that when the series resistances 11.1 and 11.2 are operating properly, the voltage across any two of the electrodes is below the starting voltage of the lamp. Impedance means 9, 10 and 20 are also selected such that if either series resistance 11.1 or 11.2 of the resistance heating means fails, and produces an open circuit, the voltage across two of the electrodes will exceed the starting voltage to light the lamp to signal the failure.

It will now be evident that the invention provides a positive signal of failure, the lighting of the lamp 15, which is easily detectable. Further, the lamp 15 and impedances 9 and 10 draw very little power, and therefore they are inexpensive to operate and do not interfere with or detract from the operation of the resistance heating means. Still further, the lamp, impedances, and wiring are inexpensive, thereby making it possible to supply a safety signal as an inexpensive addition to many varieties of electrical heating apparatus. In addition, the signal device is highly permanent and durable, having no elements, such as bimetal switches, which are susceptible to deterioration upon aging; there is thus little chance that the device will fail to work. Also, the device is highly flexible in use, being adaptable by proper selection of signal means and impedances, to a wide variety of voltages and heater resistances encountered in practice.

I claim:

1. Apparatus for indicating failure of a resistance heating device having a housing and a pair of terminals for connection of the heater resistance to a power supply, comprising a three-input signal means remote from said housing and of the type giving a detectable signal whenever the voltage across any two inputs exceeds a starting voltage;

a first lead dividing the heater resistance intermediate said terminals into two series resistances, said lead extending from said housing to said signal means and being connected to a first of said inputs;

a second lead extending from one of said terminals at said housing to said signal means and being connected through a first impedance means to the second of said inputs;

a third lead extending from the other of said terminals at said housing to said signal means and being connected through a second impedance means to the third of said inputs;

said impedance means having values such that said starting voltage is exceeded only when one of said series resistances fails and produces an open circuit.

2. Apparatus according to claim 1 wherein said series resistances are equal in value to each other, and wherein said first and second impedance means are equal in value to each other.

3. Apparatus according to claim 1 further comprising a third impedance means connected between said second and third of said inputs.

References Cited

UNITED STATES PATENTS 2,021,062 11/1935 Helmbright.
3,099,828 7/1963 Kelley _____ 340—248

FOREIGN PATENTS 249,809 2/1964 Australia.

JOHN W. CALDWELL, Primary Examiner

DANIEL MYER, Assistant Examiner

U.S. Cl. X.R.

219—506; 340—251